United States Patent Office 3,225,007
Patented Dec. 21, 1965

3,225,007
POLYURETHANE COMPOSITIONS CURED
WITH ORGANIC PEROXIDES
Elbert E. Gruber, Cuyahoga Falls, Ohio, and Orin C.
Keplinger, Flossmoor, Ill., assignors to The General
Tire & Rubber Company, Akron, Ohio, a corporation
of Ohio
No Drawing. Continuation of application Ser. No.
535,280, Sept. 19, 1955. This application Oct. 8, 1962,
Ser. No. 229,210
14 Claims. (Cl. 260—75)

This application is a continuation of our co-pending application Serial No. 535,280, filed September 19, 1955, now abandoned.

This invention relates to polyurethane polymeric compositions. It particularly relates to curable rubbery and rigid polyurethane polymers and to a method of preparing said polymers.

The high polymers, the polyurethanes, and particularly those which are predominantly composed of linear molecules, have wide commercial possibilities; but, their utilization has been greatly retarded because of the fact that they can be stored compounded ready for cure and for application to tires, etc., for only limited periods of time before they are processed into a final article. The long-chain polyurethane polymers, particularly the linear polyurethane rubbery polymers, are prepared by reacting a generally linear polyester or polyether, or a combination of these materials with one or more organic diisocyanates. In the preparation of these materials the diisocyanate links shorter polyester and/or polyether molecules together into long chains, and also excess isocyanate over that which is required to react with the polyester molecules in a molar 1:1 ratio remains in the polymer to act as a curing or crosslinking agent, which changes the plastic linear molecules to a nonplastic, crosslinked network.

It has been considered necessary to utilize a very substantial excess of isocyanate to provide curing properties in the polyurethane polymers. The excess isocyanate reacts not only at elevated temperatures but also reacts relatively rapidly at room temperatures, so that the plastic urethane polymers generally must be used relatively promptly and with great care after they are prepared to provide the desired shaped articles. This results in a marked disadvantage and has prevented the substantial use of the polyurethane polymers, particularly the linear polyether and polyester rubbers, in the manufacture of complex articles, such as pneumatic tires and the like.

In order to overcome this setup after the preparation of the polymer, it has been proposed to manufacture the polyurethane polymer with a deficiency or a very slight excess of isocyanate and to later add the substantial excess isocyanate required for curing just before it is desired to use the article. With this two-step addition, there is some indication that the quality of the cured polymer is not as high as that formed with a one-step addition of substantial excess. Such procedure, while somewhat better than adding all of the isocyanate initially, still is disadvantageous in that the materials are scorchy and very difficult to handle in preparing articles because reaction with isocyanate for cross linking occurs not only at elevated temperatures but also at normal temperatures at a very rapid rate.

It is an object of the present invention to provide polyurethane compositions which may be compounded ready for curing and stored for substantial periods, which may be milled without scorching, and which may be vulcanized by merely subjecting the compositions to elevated temperature and pressure without adding substantially additional isocyanate or other material after the required storage period.

It is another object of the present invention to provide a method of making such compositions.

Carbon black, when added to ordinary synthetic rubbers has marked beneficial effects, both in increasing the strength and increasing the abrasion and cut resistance of the article. When added to the rubbery linear polyurethanes, carbon black has been considered to have quite the opposite effect in that it ordinarily decreases the desirable properties of the resultant polymer.

It is a further object of the present invention to provide a method of making polyurethane polymeric compositions and particularly polyurethane rubbery polymers which can be compounded with carbon black as well as other pigments and powders and cured to provide improved properties in the composition.

It is a further object of the present invention to provide polyurethane ether base compositions which can be cured and stored, and which can be compounded with carbon black to give rubbery products having good properties.

It is a still further object of the present invention to provide a rubbery polyester composition which can be cured, stored and compounded with carbon black in the same manner with about the same ease as one experiences with the ordinary rubber compositions.

We have found that polyurethane polymers substantially prepared by reacting linear polyesters and/or polyethers, other than those consisting solely of isopropyl ether groups, with organic diisocyanates may be cured with dialkyl peroxides of the general formula

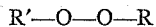

where R+R' are selected from substituted and unsubstituted organic hydrocarbon groups, including alkyl, aralkyl and such groups containing one or more nonfunctioning groups and/or alkyl groups as substitutes, and in addition where R' may be an acyl group. Further, R' may be hydrogen provided R is a tertiary alkyl group. Diacyl peroxides are ineffective for cure of black compounded polyurethanes. Therefore, in one of R+R' in the above formula one of the carbons connected directly to peroxide oxygen should be directly connected to but that one oxygen atom. Those peroxides containing an aliphatic group of at least 2 carbon atoms are superior to those with a smaller number of aliphatic carbon atoms and those containing a tertiary aliphatic carbon are much superior, particularly when they are activated by presence of a benzene or other aromatic group closely adjacent the tertiary carbon. The organic peroxides apparently withdraw hydrogen atoms from activated methylene groups of polyesters and polyethers to form free radicals in the respective chains which can crosslink the molecular chains together. For some unknown reason, polyisopropylene ether isocyanates containing no polyester linkages or ether groups other than isopropyl ether groups have not cured with the peroxides of the above general formula. While the use of certain of the diacyl peroxides as curing agents has been proposed for many silicone rubbers and certain peroxides have been found to be curing agents for polydiolefinic rubbers, the presence of carbon black in these rubbers has generally been found to greatly inhibit the curing of such materials with the peroxide. We have also found that while organic peroxides of the above formula will effect a cure in polyurethane rubber gum stocks, when these polyurethane materials are compounded with carbon black, these peroxides have required an aliphatic group with a tertiary carbon for effective cure. Furthermore, the presence of at least one araliphatic group with tertiary aliphatic carbon atom contributes greatly to the effectiveness in curing these carbon black compounded polyurethanes. Thus, while benzoyl peroxide and cumene hydroperoxides, etc., have been found to be completely ineffective in curing the carbon black compounded polyurethanes devoid of substantial molar excess diisocyanate, di tertiary butyl peroxide does effect a cure although rather slowly and dicumyl peroxide provides a relatively fast cure.

When the peroxide is dicumyl peroxide, the carbon black has no destructive effect. Polyurethanes (with the exception of those made from polyisopropylene glycols and diisocyanates) compounded with substantial amounts of carbon black may be cured to provide excellent properties even though the diisocyanate is not present in any molar excess so as to be available for curing as evidenced by failure of cure to occur at long standing (a month or so) or at curing temperature without the peroxide addition.

While the peroxide cures of the present invention are applicable to polyurethanes of varying polyester/isocyanate and polyether/isocyanate ratios, the present invention is primarily concerned with polyether urethanes and polyester urethanes and mixed polyester and polyether urethanes of high molecular weight which have a molar ratio of about 1:1, that is, those in which the amount of isocyanate is theoretically substantially equal to or only slightly in excess of that required to react with all of the hydroxyl groups in the polyester and polyether material. Those polyurethanes having no substantial excess of isocyanate remain plastic indefinitely, are not scorchy, and may be compounded and stored. When the amount of diisocyanate material is increased substantially above the 1:1 molar ratio of polyester isocyanate or polyether isocyanate, storageability is greatly decreased and scorchiness is greatly increased.

We have discovered that by controlling the excess of diisocyanates to a range of about 6 to 15 percent above the molar ratio of 1:1 to polyester, surprisingly enough, the resultant polyester or polyether diisocyanate rubbers may be compounded with carbon black and cured even without one or more of the above peroxides to produce rubbers with reasonably good hot tensile strength, flex properties, and unexpected relatively long storage life of the unmilled gum when protected against undue exposure to the moisture in the air. These polyurethanes with the slight (6% to 15%) molar excess of diisocyanate are also curable with the above peroxides to produce exceptionally good vulcanizates, while at the same time, permitting good processability. While an excess of about 8% of the diisocyanate over the 1:1 molar ratio is preferred, an excess of as low as about 6 or as high as 15 percent will produce polyurethanes which may be mixed with carbon black to produce, as above stated, improved urethane rubbers with or without the addition of other curing agents.

As above noted, the linear polyurethanes of the present invention may be made both from polyester and polyether base materials (containing at least some ester or ether groups besides isopropyl ether groups) and mixed polyester and polyether base materials and varying amounts of other active hydrogen compounds by reacting them with the requisite amount of diisocyanate.

In order to make rubbery urethanes, i.e., those which are rubbery at normal temperatures, the molecular weight of the polyesters and of the polyethers prior to reaction with the polyisocyanate is quite important. Also, in order to provide polyesters of linear rubbery polymers of the solid nonporous type, the low acid number linear polyesters and polyethers are desirable. Acid numbers in polyesters of less than one give products which are superior, although we can, in accordance with the present invention, use polyesters with a much higher acid number, even to the range of an acid number 60. The molecular weight of the polyesters should, for the preparation of rubbery polyurethane polymers, be above 500 and preferably above 1000. The maximum molecular weight of the polyester is dependent only upon the ability to economically make the polyesters of higher molecular weights, the higher molecular weights being preferred. Generally, it is exceedingly difficult to obtain polyesters with a molecular weight much above 3000 or 4000 without substantially higher costs.

The polyethers used for preparing the improved polyurethane compounds have a molecular weight of at least 600 and preferably more; if materials rubbery at normal temperatures are desired, molecular weights of over 1000 are preferred.

When the molecular weight of the polyether used for reacting with the isocyanates is less than 500 or 600, the product, while plastic, is too rigid for application as rubbery base materials at ordinary temperatures. However, according to this invention, rigid polyurethanes may be cured. When the polyethers and polyesters, for example, have molecular weights under 1000 and preferably under 500 to 600, rigid-type linear polyurethanes are formed which may also be advantageously cured using the methods of this invention.

Rigid polyurethanes may also be produced by increasing the amount of crosslinking in the resultant polyurethane, for instance, by using a crosslinking agent, such as trimethylol propane, or by using polyesters or polyethers of the crosslinking type.

The preferred polyethers for polyurethane elastomers are mixed poly(ethylene-propylene) ether glycols, and polytetramethylene ether glycol. Desirable properties for the polyethers are active methylene groups, a very low acid number or no acid number and hydroxyl groups on the ends of the molecular chain.

Examples of suitable polyethers are from the class of polyalkylene ether glycols, such as polyethylene glycol, such as "Carbowax," having a molecular weight of about 1000, polytetramethylene ether glycol, polytrimethylene ether glycol, polyneopentylene ether glycol, polypentamethyene ether glycol, preferably having a molecular weight of above 600 and preferably of about 2000 to 4000, and mixed polyalkylene ether glycols such as poly(ethylene-propylene) ether glycols. Polyisopropylene gycols composed only of isoproylene ether groups are found for some reason not to be suitable in accordance with the present invention, although when mixed with other polyglycols or with polyesters, they can be used if the molar percentage is not appreciably above 50 percent of the mixture.

Suitable polyesters for use under the invention are any polyesters containing ethylene and/or propylene groups or any linear polyester containing an active methylene group. The active methylene group apparently reacts in the curing or cross-linking by the above described peroxides described in this invention.

As low a molecular weight as 500 and as high a weight as 3000 or 4000 or more for these linear polyesters can be utilized. They should, as aforementioned, be dihydroxy terminated and have an acid number preferably under 1, although an acid number up to 60 can be utilized Viscous materials are preferred, such as polyethylene propylene adipate. It is also possible to provide crosslinking sites for reaction with peroxides in the diisocyanate portion of the polyurethane.

The following example, in which parts are by weight unless otherwise stated, illustrates the preparation of esters suitable for use in making rubbery linear polyurethane curable in accordance with the present invention.

EXAMPLE 1

This polyester used as a base material for reaction with the diisocyanate in accordance with this invention, for example, can be prepared as follows:

6.7 mols of ethylene glycol and 3.3 mols of propylene glycol are stirred together and charged into a reaction vessel with 8.4 mols of adipic acid. The mixture is heated and refluxed to remove water and excess glycol. The reaction is stopped when the molecular weight of the linear polymer product is about 2000, the acid number is under 1 and the viscosity is 500 cps. at 73° C.

Any readily reactive organic diisocyanate having two and only two readily reactive isocyanate groups can be used for reacting with the polyester or polyether, but those having both isocyanate groups of about equal reactivity are preferred for at least part of the total isocyanate present to facilitate growth of the polyurethane chains. Tri-functional isocyanates like tri-functional polyesters act as cross-linking agents and are undesirable in appreciable quantity unless one of the functional groups is relatively non-reactive.

Various diisocyanates are commercially available and the following is a partial list:

(1) Toluene-diisocyanate
(2) p,p'-Diisocyanato diphenyl methane
(3) Napthalene-1,5-diisocyanate
(4) Bi-tolylene diisocyanate
(5) Di-anisidine diisocyanate
(6) Paraphenylene diisocyanate
(7) Metaphenylene diisocyanate
(8) Meta xylylene diisocyanate
(9) Benzidine diisocyanate The quantities of diisocyanates and polyesters or polyethers when used in accordance with this invention should be close to a one-to-one molar ratio for best results. When used in this ratio, the resulting polyurethanes have good stability and may be milled and stored indefinitely. Evidence of slight cure or set up can sometimes be observed at very slight excess diisocyanate over the 1:1 molar ratio of diisocyanate to the polyester or polyether but the one-to-one molar ratio is the most desirable.

In making the polyurethanes, the diisocyanate and polyesters and/or polyethers are mixed together and allowed to polymerize at any suitable temperature, preferably at a temperature of about 115° C. or 100° to 140° C., for a minimum time of two hours or longer. Polymerization at room temperature requires a much longer time.

The organic peroxide of the previously described general formula is used at about 1 to 4 parts by weight per 100 parts of polyurethane for best results. More than 5 parts by weight of a highly active peroxide such as dicumyl peroxide is generally undesirable, since the curing would be accomplished too quickly, although 5 or 8 parts may be used in some instances. Generally, about 2 or 3 parts is used. Evidence of some cure can be observed with even 0.2 by weight of the above peroxides per 100 parts of the polyurethane, although more complete and satisfactory cures are obtained with ½ part or more.

The peroxide may be incorporated in any suitable way, either as essentially pure peroxide or peroxide supported on a suitable filler by mastication on a Banbury mill, etc., and is milled in along with any other compounding materials that might be desirable. Carbon black milled in at a ratio of 10 to 60 parts by weight has been found surprisingly to impart to the polyurethane rubbers superior properties, such as improved tensile, tear, wear and abrasive resistance. Other dry pigments such as clay, calcined silica (HiSil), or calcium carbonate may be substituted for part or all of the black to give vulcanizates with usable properties, although the carbon black stocks have been found to be considerably superior.

After compounding and milling, the polyurethanes are cured, generally from 10 to 120 minutes at approximately 60 to 35 pounds steam pressure.

EXAMPLE 2.—POLYESTER URETHANES

A polyurethane was prepared from the following amounts of polyester and diisocyanates:

1 mol polyester—(ethylene, 67% by wt.; propylene, 33% adipate (mol wt. 2000 and acid number under one), viscosity 500 cps. at 73° C.). Prepared as in Example 1.
1 mol of M.D.I.—(p,p'-diisocyanato-diphenyl-methane). Manufactured by Monsanto.

The mixture was allowed to stand two hours at 115° C. in a closed container.

The resulting polyurethane was masticated on a rubber mill with the following ingredients to form a homogeneous mixture, as indicated below:

Polyurethane—100 parts by weight
EPC (carbon black)—30 parts
Acrawax C—2 parts
Di-cumyl peroxide—3 parts This was sheeted out and cured in test-specimen molds for 45 minutes at 50 lb. steam pressure. The rubber produced had excellent physical properties as shown in Table 1.

EXAMPLE 3.—POLYETHER-URETHANES

A polyurethane was prepared, again using a 1:1 molar ratio, as follows:

1 mol of a polyether, namely poly tetramethylene ether glycol (mol. wt. 3000)
1 mol of M.D.I. (p,p'-diisocyanato-diphenyl methane)

The above ingredients were mixed together thoroughly and allowed to stand in a suitable container at 115° C. for 16 hours to form a rubbery polyurethane. The polyurethane formed was mixed or compounded as was the polyurethane of Example 2, with the ingredients shown below:

Polyurethane—100 parts by weight
EPC (carbon black)—15 parts
Di-cumyl peroxide—3 parts The compounded rubber, like that of Example 2, was thoroughly stable to storage for several months and was sheeted out and cured at 50 lb. steam pressure for 45 minutes. The physical properties of these peroxide-cured polyurethanes is shown in the following table:

Table 1
EXAMPLES OF THE CURED POLYURETHANES

| Test | Polyester, Example 2 | Polyester, Example 3 |
| --- | --- | --- |
| 300% Modulus (p.s.i.) | 2,165 | 620 |
| Tensile Strength (p.s.i.) | 5,245 | 3,000 |
| Elongation (percent) | 530 | 570 |
| Set (percent) | 5 | 12 |
| Hardness (Durometer) | 62 | 57 |
| Crescent Tear (Pounds per in.) | 292 | 130 |
| Flexing Number for Standard Crack Growth | 100,000 | (¹) |
| Hot Tensile Strength (205° F.) | 1,568 | (¹) |
| Elongation (205° F.) | 330 | (¹) |
| Goodrich Hysteresis (212° F.): | | |
| Δt (° F.) | 55 | 43 |
| Set (percent) | 6 | 8.3 |
| Goodyear Healy Rebound (percent) | 66.8 | (¹) |
| Compression Set (ASTM Method B) (percent) | 20 | (¹) |

¹ Not run.

One of the greatest advantages gained by the peroxide cure of polyurethanes is the elimination of scorching in the gum stock. Not only is it possible to store these compounds for several days, even months, after the incorporation of the peroxide curing agent, but it is also possible to process the stock under normal factory conditions. Another definite advantage is the response of the prepared polyurethane stock to dynamic stress.

In the above example the polyester and polyether may be substituted in whole or in part by equivalent amounts of other polyesters and/or polyethers as hereinafter noted. The diisocyanate may be substituted in whole or in part by other organic diisocyanates as above noted to yield generally equivalent results, although slower reactivity occurs, particularly in the case of the toluene diisocyanate, and the time of reaction should be somewhat longer as is well known. The peroxide can be substituted in whole or in part by other peroxides having tertiary aliphatic carbon, although curing time may be lengthened or shortened due to different reactivity.

A very slight excess of diisocyanate in the range of only 6% to 15% over the 1:1 molar ratio of diisocyanate to polyester or polyether may be substituted for the peroxide to provide a cure, although the simultaneous use of peroxide is still desirable for optimum properties.

Examples of dialkyl peroxides which may be used to obtain cures of the polyurethanes in accordance with the present invention include besides dicumyl peroxide with the formula:

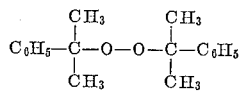

ditertiary butyl peroxide, di 2,2 bis (t-butyl peroxy) butane; the chloro substituted dialkyl peroxides, including the 2,2 bis (ortho, meta, and para mono chlorophenyl) isopropyl peroxides, the 2,2 bis (di and trichlor phenyl) isopropyl peroxides, the 2,2 bis (chlorotolyl) isopropyl peroxides, such as 2,2 bis (3 chloro 4 methyl phenyl) isopropyl peroxide etc., the 2,2 bis (toluyl) isopropyl peroxides and the corresponding brominated and fluorinated and nitro compounds.

To illustrate the effect of various peroxides on the curing of polyurethanes, a polyester urethane rubber similar to that of Example 2 above was subdivided into several portions, some of which were compounded with 20 parts by weight of carbon black and 3 parts of the curing agent indicated in Table 2 and cured to produce a black product and part of said portions were merely compounded with the 3 parts of the respective peroxide or other curing agent listed in Table 2 to provide upon curing a gum product. The products were cured in standard test mold and the products after curing were tested to determine tensile strength. Zero tensile shows zero cure. The results are shown in Table 2 below where it will be seen that the dialkyl peroxides, t-butyl perbenzoate and t-butyl hydroperoxide cure the polyurethanes to operable extent in the presence of carbon black, whereas the ketone peroxides, and the di-acyl peroxides are completely ineffective.

Table 2

| Curing Agent | Tensiles/p.s.i. | |
| --- | --- | --- |
| | Gum | Black |
| Dialkylperoxides: | | |
| Di t-butyl peroxide | 1,300 | 2,100 |
| Di cumyl peroxide | 1,825 | 4,800 |
| Di 2,2 bis (t-butyl peroxy) butane | 1,400 | 2,700 |
| Alkyl hydroperoxides: | | |
| t-Butyl hydroperoxide | 925 | 1,375 |
| Cumenehydroperoxide | 50 | |
| p-Methane hydroperoxide | 50 | |
| Diox 7 | 50 | |
| Alkyl peresters: t-butyl perbenzoate | 2,150 | 1,175 |
| Acyl peroxides: | | |
| Benzoyl peroxide | 1,525 | 0 |
| Lauroyl peroxide | 2,000 | 0 |
| Ketone peroxides: | | |
| Methyl ethyl ketone peroxide | 0 | 0 |
| Cyclohexanone peroxide | 0 | 0 |
| Methyl amyl ketone peroxide | 0 | 0 |
| Other: Porophor N (bis-azoisobutyronitrile) | 0 | 0 |

Furthermore, it is to be understood that, in accordance with the provisions of the patent statutes, the particular form of product shown and described and the particular procedure set forth are presented for purposes of explanation and illustration and that various modifications of said product and procedure can be made without departing from our invention.

Having thus described our invention, what we claim is:

1. A composition comprising a curable rubbery polyurethane having activatable methylene groups and being selected from the group consisting of rubbery polyesterurethanes and rubbery polyetherurethanes and, as a curing agent for said rubbery polyurethane, an organic peroxide free of acyl groups and having a tertiary aliphatic carbon atom attached to a peroxide oxygen atom, which carbon atom is not directly connected to any other oxygen atom.

2. A curable rubber produced by the chain extension with an organic diisocyanate, containing as its sole reactive groups the isocyanato groups, of at least one dihydroxy-terminated polyol having a molecular weight of at least 500 and selected from the group consisting of (a) poly(alkylene ether) glycols comprising a plurality of ether linkages selected from the group consisting of those having two and those having more than three carbon atoms in hydrocarbon groups separating next adjacent oxygen atoms, and (b) polyesters of a dicarboxylic acid with a dihydric alcohol, said polyester being free of aliphatic unsaturation, essentially the sole organic polymer-forming ingredient of said rubber being said polyol and containing as a curing agent from .5% to 5%, based on the weight of said rubber, of an organic peroxide free of acyl groups and having a tertiary aliphatic carbon atom attached to a peroxide oxygen atom, which carbon atom is not directly connected to any other oxygen atom.

3. The product according to claim 2 wherein a polyester is reacted with said diisocyanate in producing said rubber.

4. A cured rubber article prepared by heating the product of claim 2 to a curing temperature.

5. A curable polyester rubber produced by the chain extension with an organic diisocyanate, containing as its sole reactive groups the isocyanato groups, of a substantially linear low molecular weight saturated polyester of a dicarboxylic acid with a dihydric alcohol, said low molecular weight polyester containing hydroxyl groups, said polyester rubber containing said polyester as essentially the sole organic isocyanate-reactive polymer-forming ingredient and containing as a curing agent from 0.5 to 5% based on the weight of said polyester rubber of an organic peroxide of the general formula

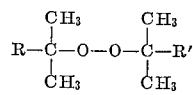

where R is an organic hydrocarbon group free of ethylenic unsaturation and where R' is selected from the groups consisting of alkyl, aralkyl and such groups substituted by a non-functioning group.

6. A cured rubber article prepared by heating the product of claim 5 to a curing temperature.

7. A polyurethane curable to the stretchable rubbery state and which can be stored for substantial periods at room temperature without hardening or curing or appreciable loss in weight, said polyurethane consisting essentially of (1) about 100 parts by weight of a rubbery reaction product of (a) at least one dihydroxy terminated polyol having a molecular weight of at least 500 and being selected from the group consisting of poly(alkylene ether) glycols, which comprise a plurality of recurring ether linkages selected from the group consisting of those having two and those having more than three carbon atoms in hydrocarbon groups separating next adjacent oxygen atoms, and chemically saturated polyesters of a dicarboxylic acid with a dihydric alcohol, and (b) sufficient organic diisocyanate having isocyanato groups as its sole reactive groups to react with at least most of the free hydroxyl groups of said polyol so that the amount of diisocyanate used is from a slight deficiency of that required to make an equal molar ratio with the polyol to a slight excess of no more than about 15%, said polyol being essentially the sole isocyanate-reactive organic polymer-forming ingredient in said rubbery reaction product and (2) as a curing agent, about .2 to about 8 parts by weight of an organic peroxide of the general formula

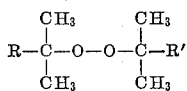

and where R' is selected from the group consisting of alkyl, aralkyl and such groups substituted by a non-functioning group and where R is an organic hydrocarbon group free of ethylenic unsaturation.

8. An uncured product of claim 7 wherein the organic peroxide is bis(alpha, alpha-dimethylbenzyl) peroxide.

9. A cured product according to claim 7 wherein the peroxide is bis(alpha, alpha-dimethylbenzyl) peroxide, said polyurethane also containing 10 to 60 parts by weight, based on 100 parts by weight of rubber reaction product, of carbon black.

10. A method of making a cured rubbery polyurethane composition comprising controlling the molar ratio of an aliphatically saturated organo-diisocyanate to dihydroxy terminated polyol having a molecular weight of at least 500 and selected from the group consisting of saturated polyesters of a dicarboxylic acid with a dihydric alcohol and poly(alkylene ether) glycols comprising a plurality of recurring ether linkages selected from the group consisting of those having two carbon atoms and those having more than three carbon atoms separating adjacent oxygen atoms, so that diisocyanate is used in amounts of about equal molar to about 15% over a 1:1 molar ratio, reacting the polyol with said isocyanate to form a polyurethane elastomer, mixing 100 parts by weight of said polyurethane elastomer with, as a curing agent, about .2 to 8 parts by weight of an organic peroxide free of acyl groups and having tertiary aliphatic carbon atom attached to a peroxide oxygen atom which carbon atom is not directly connected to any other oxygen atom, and curing the resultant product at elevated temperature to cause crosslinking of said polyurethane elastomer by means of said peroxide.

11. The method of curing a polyurethane elastomer which is a reaction product of an aliphatically saturated organic diisocyanate and an aliphatic dihydroxy terminated polyol having a molecular weight of at least 500 and selected from the group consisting of saturated polyesters of a dicarboxylic acid with a dihydric alcohol and poly(alkylene ether) glycols comprising a plurality of recurring ether linkages selected from the group consisting of those having two carbon atoms and those having more than three carbon atoms separating adjacent oxygen atoms, which comprises incorporating in said polyurethane elastomer about .2 to about 8 parts by weight of an organic peroxide of the general formula R'—OOR, where R and R' are organic hydrocarbon groups free of ethylenic unsaturation and of at least three carbon atoms, each of which contains a tertiary aliphatic carbon atom directly connected to peroxide-oxygen, and curing the resultant mixture at elevated temperatures to cause crosslinking of said polyurethane rubber by means of said peroxide.

12. The method of claim 11 wherein 10 to 60 parts by weight of carbon black, based on 100 parts by weight of polyurethane elastomer, is also incorporated into the elastomer prior to curing.

13. A method of making a polyurethane rubber comprising controlling the molar ratio of an organic diisocyanate free of ethylenic unsaturation to a dihydroxy terminated poly(alkylene ether) glycol, which is characterized by comprising a plurality of recurring ether linkages selected from the group consisting of those having two and those having more than three carbon atoms separating some next adjacent oxygen atoms and by having a molecular weight of at least 500, to about 1:1, reacting said polyether glycol with said diisocyanate to form a polyurethane, mixing said polyurethane with, as a curing agent, about .2 to about 8 parts by weight per 100 parts by weight of said polyurethane of bis(alpha, alpha-dimethylbenzyl) peroxide.

14. A curable composition comprising a polyester rubber produced by the chain extension with an organic diisocyanate, containing as its sole reactive groups the isocyanato groups, of a substantially linear low-molecular weight polyester of a dicarboxylic acid with a dihydric alcohol, said low-molecular weight polyester containing hydroxyl groups, said polyester rubber containing as a curing agent from 0.5 to 5% based on the weight of said polyester rubber of bis(alpha, alpha-dimethylbenzyl) peroxide.

References Cited by the Examiner

UNITED STATES PATENTS 2,962,183  11/1960  Rill et al. _____ 260—2.5
3,036,042   5/1962  Schmidt et al. _____ 260—75

LEON J. BERCOVITZ, *Primary Examiner.*